United States Patent [19]

Gott et al.

[11] Patent Number: 4,593,489
[45] Date of Patent: Jun. 10, 1986

[54] INSECT SWATTER

[76] Inventors: Mary L. Gott; Robert E. Broadley, both of 388 E. Orange Rd., both of Westerville, Ohio 43081

[21] Appl. No.: 769,050

[22] Filed: Aug. 26, 1985

[51] Int. Cl.$^4$ .............................................. A01M 3/02
[52] U.S. Cl. ................................................... 43/137
[58] Field of Search ........................................... 43/137

[56] References Cited

U.S. PATENT DOCUMENTS

| | | | |
|---|---|---|---|
| 1,190,165 | 4/1916 | Hemenway | 43/136 |
| 2,686,327 | 8/1954 | King | 43/137 |
| 2,686,329 | 8/1954 | King | 43/137 |
| 2,891,347 | 6/1959 | Swint | 43/137 |
| 2,931,126 | 4/1960 | Schuler | 43/137 |
| 3,798,828 | 3/1974 | Walti | 43/137 |
| 3,984,937 | 10/1976 | Hamilton | 43/137 |
| 4,502,243 | 3/1985 | Spindler | 43/137 |

Primary Examiner—Gene P. Crosby
Attorney, Agent, or Firm—Dowell & Dowell

[57] ABSTRACT

An insect swatter for use in killing flies, moths, mosquitoes and other flying or crawling insects and which includes a generally flat and flexible body portion which is carried on an elongated handle. At least one side or face of the body portion is provided with a plurality of short closely spaced generally hook-like flexible filament projections which function to engage or entangle portions of a swatted insect relative to the body portion of the swatter without impaling the insect.

6 Claims, 4 Drawing Figures

INSECT SWATTER

BACKGROUND OF THE INVENTION

1. Field of the Invention

This invention is generally directed to swatters and similar devices for killing flying insects such as house flies and particularly to an insect swatter which has a plurality of generally blunted hook-like projections extending from at least one face thereof. The projections are closely spaced and serve to engage or entangle and lock with hair-like portions of swatted insects to thereby retain the dead insects adjacent to the body of the swatter in such a manner that the dead insects may be cleanly and easily released from the swatter.

2. History of the Prior Art

There have been many variations proposed for improving the usefulness of conventional fly swatters and the like. Many improvements have been made in making conventional fly swatters more durable and yet more inexpensive to manufacturers. Other improvements or alterations in structure have been made to increase the overall efficiency of fly swatters in killing flying or crawling insects.

In various environments, such as in commercial restaurants, kitchens and the like, it is important, for sanitary reasons, to provide some means to insure that swatted insects or bugs are retained on the swatter after they have been struck. Various designs or special configurations have been proposed for enabling fly swatters to be used to both kill and capture or retain insects. Many of these prior structures, however, are not satisfactory from a sanitary point of view as they are designed to not only capture insects but positively impale the insects using point shafts, hooks and/or barbs.

In U.S. Pat. No. 2,891,347 to Swint, a fly swatter is disclosed having arrow-shaped protrusions extending therefrom. The protrusions include hooked or barbed members which serve to trap insects between the protrusions and the face or body of the fly swatter. Some of the problems associated with the design are discusssed in U. S. Pat. No. 3,798,828 to Walti et al. These problems include the removal of a dead insect from the barbs which impale the insect. Fly swatters which impale insects create additional sanitary problems because blood and/or portions of insects not only may be smeared on the surface where the insects are initially struck but may also be deposited on the face of such flyswatter.

In the aforementioned U.S. Pat. No. 3,798,828, a fly swatter is disclosed which includes a plurality of tapered projections which extend from the face thereof. The projections are not barbed but are designed to impale insects in such a manner that the insects may be easily removed from the projections.

In order to avoid the problems and disadvantages inherent in the use of fly swatters which utilize impaling protrusions to retain or hold swatted insects, other non-penetrating fly swatter structures have been designed. In U.S. Pat. No. 3,984,937 to Hamilton, a fly swatter is disclosed which has a striking surface covered with a layer of material which is capable of holding an electrostatic charge. In the use of this type of fly swatter, it is theorized that an electrostatic charge may be applied to the material which charge would be sufficient to cause flies and other insects to adhere thereto. The proper functioning of such a structure is variable depending upon such conditions as the amount of charge applied, how and when the charge is applied, and the atmospheric conditions including moisture or humidity in the area in which the fly swatter is to be used.

Other examples of prior art devices for capturing flies and other insects include U.S. Pat. Nos. 2,931,126 to Schuler and 4,502,243 to Spindler.

SUMMARY OF THE INVENTION

An insect swatter for swatting and then retaining such insects as flies and the like in which the body of the swatter is either covered or formed having a plurality of closely spaced, J-shaped or hook-like, short, flexible filament projections extending therefrom. The outermost portions of the projections are rounded or bent so that they are relatively blunt so as to resist penetration of an insect upon impact but are so shaped and spaced with respect to one another and the body of the swatter that they will engage and entangle the hair-like portions of a fly or similar insect and thereby entrap the insect along the body of the swatter. The projections, although flexible, are stiff enough to create an effective striking surface. In the preferred embodiment of the invention, the projections are formed by covering at least one side of the body of the swatter with a material sold under the trademark "Velcro".

It is the primary object of the invention to provide a fly or insect swatter which may be used to both kill insects or flies by impact and simultaneously retain the dead or stunned insects in engagement therewith until the insects are deposited therefrom into a litter or trash receptacle.

It is another object of the present invention to create a fly or insect swatter which includes a plurality of short hook-shaped filament-like projections which will engage and retain flies or insects hit by the swatter without impaling such flies or insects.

It is also an object of the present invention to provide a fly or insect swatter which may be used in areas requiring sanitary practices to be strictly enforced including restaurants, drive-ins, commercial kitchens, bakeries and the like wherein flying or crawling insects may be killed and disposed of without creating unsanitary deposits on the swatter or on floors, cabinets, countertops, and walls and other surfaces.

DESCRIPTION OF THE PREFERRED EMBODIMENT

Figure 1:
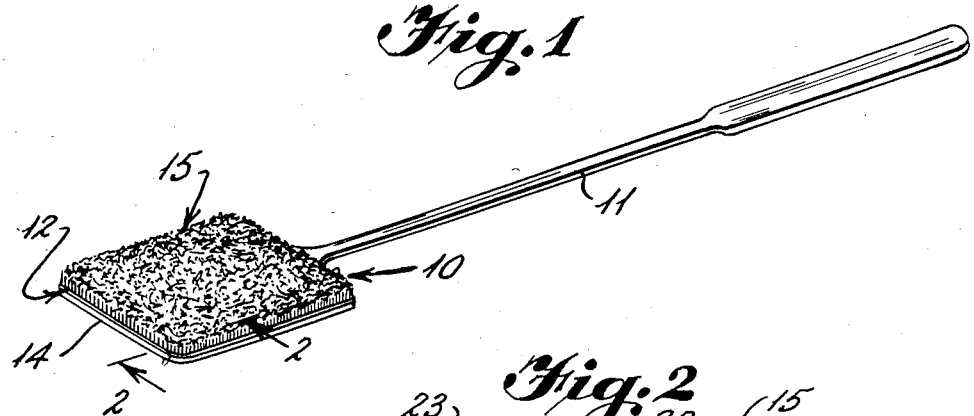
FIG. 1 is a perspective view of one form of insect swatter made in accordance with the teachings of the present invention.

With continued reference to the drawings, the insect swatter 10 of the present invention is shown as including an elongated handle 11 which is joined at one end to the body 12. The body 12 of the insect swatter is shown as being generally flat and rectilinear in configuration although other configurations may be used. The body includes an upper surface 13 and lower surface or face 14. A plurality of openings (not shown) may also be provided through the body to permit air to pass therethrough and thereby decrease the amount of resistance encountered by the body portion of the swatter during use.

The handle and body portions are depicted as being integrally molded from a plastic material with the handle being of a substantially greater thickness than the body. The body is flexible or plyable and may include one or more reinforcing ribs about the periphery and/or across the upper surface thereof. The exact structure of the handle and body portions may vary in accordance with desired manufacturing techniques and material supplies with the basic structure shown in the drawings only exemplifying one general style or type of swatter structure.

Figure 2:
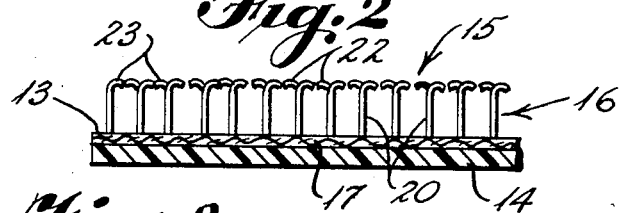
FIG. 2 is an enlarged partial cross-sectional view taken along lines 2—2 of FIG. 1.
Figure 3:
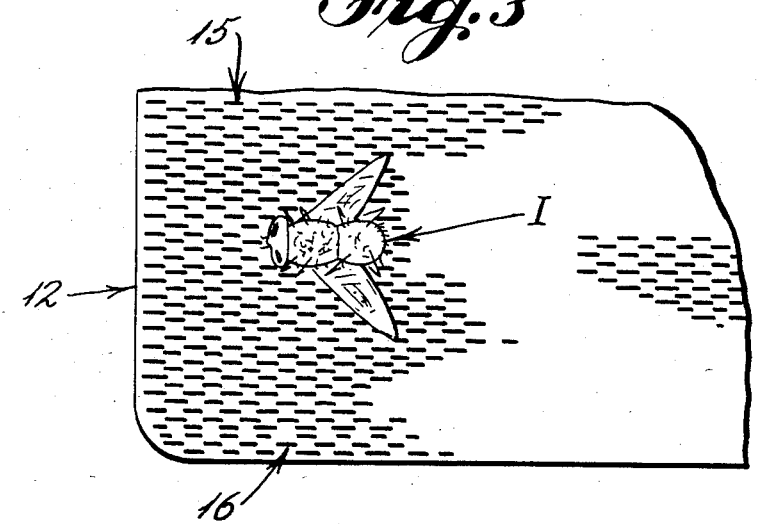
FIG. 3 is an enlarged partial top plan view of the body portion of the insect swatter illustrating an insect being engaged by the hook-like filament projection.

With particular reference to FIG. 2, the upper surface 13 of the body 12 of the insect swatter has a layer of "VELCRO" 15 adhesively affixed thereto. The "VELCRO" material includes a plurality of relatively short, hook shaped or J-shaped filament members 16 which are formed so as to extend generally perpendicularly outwardly of the base layer 17 of the material. The filaments 16 have generally straight base portions 20 and outermost portions 22 which are blunt or curved so that the end portions 23 thereof extend in a direction normal to the elongated axis of the straight base portions or slightly toward the face or upper surface 13 of the body portion of the swatter. The ends 23, however, terminate in spaced relationship with respect to the base of the swatter. The hooked filaments are formed of plastic material and are closely spaced and are generally not further apart than approximately 1.0 to 2.0 mm.

Due to the structure of the "Velcro" filaments and the spacing of the filaments, it has been found that such filaments will entangle or engage with the hair-like portions H found on many insects I including common house flies. Further, as the filaments are somewhat resilient and include the blunted outer portions 22, the filaments will generally tend to be deflected slightly laterally upon impact and thereby will not impale the body of an insect which is struck utilizing the surface material of the present invention. This deflection is possible even though the filaments are somemwhat rigid along their axis. Also, the length of the filaments generally is short enough that a fly or other similar insects will not become lodged between the ends 23 and the base layer 17 which covers the face or upper surface of body portion. In this manner, insects swatted by the swatter of the present invention will not become trapped within the hook-shaped filaments but will only become partially entangled therewith.

In order to dispose of a dead or stunned fly or other insect, the swatter is simply held over a disposal receptacle and thereafter abruptly shaken in order to dislodge or remove the fly or insect from the filament elements. As the bodies of the insects are generally not impaled by the filaments, the filaments and face of the body of the swatter should be free of any residue from the insects which are swatted and subsequently shaken therefrom.

Although only the upper or face side 13 of the body of the swatter is shown as being covered with the "Velcro" material, it is possible that both sides of the body may be covered. In this manner, either side of the swatter could be used to swat and retain insects for sanitary disposal. Also, the "Velcro" material could be mounted within a frame member without a backing surface or with only a minimal backing surface.

Figure 4:
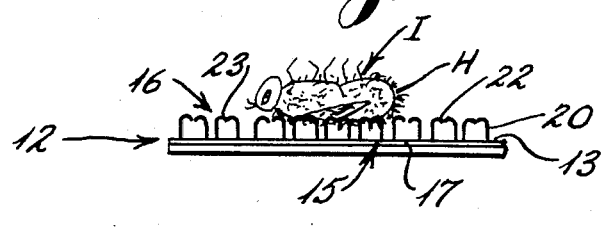
FIG. 4 is a partial side illustrational view showing the insect of FIG. 3 being engaged by the short, hook-like filaments which extend from the body of the swatter.

As opposed to using "Velcro" material per se, it could be possible to mold closely spaced, filament-like, hooked projections directly to the surface of the body of the swatter. In this manner, the filament projections would be integrally formed with the body of the insect swatter. Again, the outermost ends of the integrally formed filaments should be bent or blunted so that the projections will tend to deflect slightly upon impact and thereby decrease the likelihood of such filaments penetrating or impaling insects during use. Also, the ends thereof should be closely spaced to the surface of the body so that insects are only engaged thereby and not trapped between the ends and the surface of the body portion of the insect swatter. With reference to FIG. 4, the size of the filaments is illustrated relative to the size of a conventional housefly. Generally, the filaments will be no greater than approximately 1.0 to 2.0 mm. in length as measured from the outermost ends 22 to their base portions proximate to the body of the swatter with approximately 1.0 to 1.5 mm. being preferred.

We claim:

1. An insect swatting apparatus comprising a body portion which is carried by a handle portion, said body portion being relatively flexible and having upper and lower sides, a plurality of generally J-shaped and flexible filament projections extending outwardly from at least one of said upper and lower sides of said body portion, each of said projections having an outwardly extending base portion end portion and intermediate outermost portion, said outermost portions being substantially uniformly curved so as to be blunt with each of said end portions extending arcuately outwardly and retaining an angle with respect to the axis of said base portion, said projections being in closely spaced relationship with respect to one another whereby said projections will engage with portions of an insect being swatted to retain the insect adjacent to said body portion until the insect is selectively disengaged therefrom.

2. The insect swatting apparatus of claim 1 in which said projections extend outwardly of said one of said upper and lower sides a distance not greater than approximately 2.0 mm and said projections being spaced apart a distance of approximately 1.0 to 2.0 mm.

3. The insect swatting apparatus of claim 2 in which said body portion is relatively flat and said projections are integrally formed therewith.

4. The insect swatting apparatus of claim 1 in which said plurality of projections are formed of "Velcro" material.

5. The insect swatting apparatus of claim 4 in which said "Velcro" material is attached to both of said upper and lower surfaces of said body portion of said swatting apparatus.

6. A fly swatting apparatus havinq a flexible generally planar body portion carried by an elongated handle and wherein the body portion has opposing sides, the improvement comprising "Velcro" material secured to and extending over at least a portion of one of said opposing sides, said "Velcro" material forming a surface of uniformly curved blunt projections for both impacting without the likelihood of impaling and simultaneously interlocking with at least a portion of an insect being swatted.

* * * * *